United States Patent
He et al.

(10) Patent No.: US 11,216,832 B2
(45) Date of Patent: Jan. 4, 2022

(54) PREDICTING FUTURE USER TRANSACTIONS

(71) Applicant: Advanced New Technologies Co., Ltd., George Town (KY)

(72) Inventors: Yong He, Hangzhou (CN); Liang Zhang, Hangzhou (CN); Tian Chen, Hangzhou (CN); Yicong Fan, Hangzhou (CN); Jinhua Lei, Hangzhou (CN); Bei Liu, Hangzhou (CN); Han Mei, Hangzhou (CN); Guolai Ma, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/808,002

(22) Filed: Mar. 3, 2020

(65) Prior Publication Data

US 2020/0402078 A1 Dec. 24, 2020

Related U.S. Application Data

(63) Continuation of application No. PCT/CN2020/071097, filed on Jan. 9, 2020.

(30) Foreign Application Priority Data

Jun. 24, 2019 (CN) .......................... 201910548519.6

(51) Int. Cl.
*G06Q 30/02* (2012.01)
*G06N 3/08* (2006.01)
*G06N 3/04* (2006.01)

(52) U.S. Cl.
CPC ........... *G06Q 30/0202* (2013.01); *G06N 3/04* (2013.01); *G06N 3/08* (2013.01); *G06Q 30/0205* (2013.01)

(58) Field of Classification Search
None
See application file for complete search history.

(56) References Cited

U.S. PATENT DOCUMENTS

| | | | | |
|---|---|---|---|---|
| RE42,663 E | * | 8/2011 | Lazarus | ............ G06Q 30/0207 705/7.31 |
| 2013/0103501 A1 | * | 4/2013 | Vieri | .................. G06Q 30/0256 705/14.58 |

(Continued)

FOREIGN PATENT DOCUMENTS

| | | |
|---|---|---|
| CN | 103412915 | 11/2013 |
| CN | 104008184 | 8/2014 |

(Continued)

OTHER PUBLICATIONS

Kooti et al, Portrait of an Online Shopper: Understanding and Predicting Consumer Behavior, 2015 (Year: 2015).*

(Continued)

*Primary Examiner* — Mohamed N El-Bathy
(74) *Attorney, Agent, or Firm* — Fish & Richardson P.C.

(57) ABSTRACT

A computer-implemented method includes: obtaining first environmental factor data of a first time period and first historical payment data of a target Internet of Things (IoT) device in the first time period, in which the first time period is before a first time point; obtaining second environmental factor data of a second time period that is after the first time point; and obtaining a prediction, using a neural network model, operating on at least one computing device, of an estimated statistical distribution of one or more users who execute transactions using the target IoT device in the second time period, in which the first environmental factor data, the first historical payment data, and the second environment factor data are inputs to the neural network model.

21 Claims, 4 Drawing Sheets

(56) References Cited

U.S. PATENT DOCUMENTS

| | | | | |
|---|---|---|---|---|
| 2016/0171536 A1* | 6/2016 | Garg | ............... | G06Q 30/0255 |
| | | | | 705/14.53 |
| 2017/0032270 A1 | 2/2017 | Lee et al. | | |
| 2017/0109789 A1* | 4/2017 | Major | ............... | G06Q 30/0261 |
| 2018/0040073 A1* | 2/2018 | Ghosh | ............... | G06Q 20/401 |
| 2019/0182649 A1* | 6/2019 | Best | ............... | H04L 67/16 |
| 2019/0355004 A1* | 11/2019 | Watkins | ............... | G06Q 30/0205 |

FOREIGN PATENT DOCUMENTS

| | | |
|---|---|---|
| CN | 104766144 | 7/2015 |
| CN | 104835057 | 8/2015 |
| CN | 104991939 | 10/2015 |
| CN | 106548369 | 3/2017 |
| CN | 106651213 | 5/2017 |
| CN | 106803309 | 6/2017 |
| CN | 107895283 | 4/2018 |
| CN | 108230007 | 6/2018 |
| CN | 109509030 | 3/2019 |
| CN | 110363571 | 10/2019 |
| CN | 110969467 | 4/2020 |
| JP | 2015041121 | 3/2015 |

OTHER PUBLICATIONS

Sobolevsky et al, Predicting Regional Economic Indices Using Big Data of Individual Bank Card Transactions, 2017 (Year: 2017).*

PCT International Search Report and Written Opinion in International Application No. PCT/CN2020/071097, dated Apr. 8, 2020, 19 pages (with machine translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

PREDICTING FUTURE USER TRANSACTIONS

CROSS-REFERENCE TO RELATED APPLICATIONS

This application is a continuation of PCT Application No. PCT/CN2020/071097, filed on Jan. 9, 2020, which claims priority to Chinese Patent Application No. 201910548519.6, filed on Jun. 24, 2019, and each application is hereby incorporated by reference in its entirety.

TECHNICAL FIELD

One or more implementations of the present disclosure relate to the computer field, and in particular, to methods and apparatuses for perceiving future users of transaction services.

BACKGROUND

Currently, in various marketing activities, it is usually necessary to know characteristics of target users in advance, to implement targeted marketing. Typically, in a commercial scenario of offline payment, various enterprises and companies regularly organize various marketing activities to enhance users' awareness of payment channels, increase the frequency of using payment instruments by users, and increase users' interest to products. Specifically, various promotion activities are regularly organized for users, so that the users can participate in the promotion activities when implementing a write-off during payment. For an offline payment service scenario, some new Internet of Things (IoT) devices recently emerge. After users make a payment, a payment box can broadcast some audio notifications that include a service notification, a marketing notification, and an event notification. For the marketing audio, the offline scenario targets multiple users at the same time compared with online channels such as applications (APP).

SUMMARY

One or more implementations of the present specification describe methods and apparatuses for perceiving future users of transaction services, so that complexity and costs can be reduced when future users of transaction services are perceived.

According to a first aspect, a method for perceiving future users of transaction services is provided, and the method includes: obtaining first environmental factor data in a first time period and first historical payment data corresponding to each historical payment behavior of a target IoT device in the first time period, where the first time period is before a current time; obtaining second environmental factor data in a second time period, where the second time period is after the current time; and using the first environmental factor data, the first historical payment data, and the second environmental factor data as inputs to a pre-trained neural network model, and obtaining, by using the neural network model and in accordance with predetermined indicators, estimated statistical distribution of users who execute transactions by using the target IoT device in the second time period.

In a possible implementation, the neural network model is trained in the following way: obtaining third environmental factor data in a third time period and second historical payment data corresponding to each historical payment behavior of the target IoT device in the third time period, where the third time period is before the current time; obtaining fourth environmental factor data in a fourth time period, where the fourth time period is before the current time, and the fourth time period is after the third time period; obtaining actual statistical distribution of users who execute transactions by using the target IoT device in the fourth time period and that is defined with respect to the predetermined indicators; and training the neural network model by using the third environmental factor data, the second historical payment data, and the fourth environmental factor data as sample inputs to the neural network model and using the actual statistical distribution as sample labels.

In a possible implementation, the historical payment data includes at least one of the following: user profile data, merchant feature data, geographical location information, and sequence information.

In a possible implementation, the predetermined indicator includes at least one of the following: gender, age, and payment frequency.

In a possible implementation, the neural network model includes: a long short-term memory (LSTM) network model.

In a possible implementation, the historical payment data includes user profile data; and the user profile data is determined in the following way: obtaining raw profile data of each user, where the raw profile data includes at least one feature of age, a preference label, or the quantity of historical payments; and determining a first moment, a second moment, a third moment, and a summation result of each feature value corresponding to a target feature of each user, and using the first moment, the second moment, the third moment, and the summation result corresponding to each feature as the user profile data of each user.

In a possible implementation, the historical payment data includes environmental factor data; and the environmental factor data is determined in the following way: obtaining at least one of a weather feature, a holiday feature, and a weekend and working day feature as the environmental factor data.

In a possible implementation, the historical payment data includes merchant feature data; and the merchant feature data includes at least one of the following: an industry type of a merchant, a feature label of the merchant, trading area information of the merchant, and information around the merchant, where the industry type of the merchant is determined by a government-specified merchant category code (MCC) standard; the feature label of the merchant is set based on a printed label type of a consumption record of a user for the merchant; the trading area information of the merchant is determined based on point of interest (POI) information; and the information around the merchant is determined based on the quantity of merchants in a predetermined geographical area.

In a possible implementation, the historical payment data includes geographical location information; and the geographical location information is determined in the following way: obtaining reported active locations of each user and a geographical location of a merchant to calculate a distance between each user and the merchant; and using a combination of the distances between the users and the merchant as the geographical location information.

In a possible implementation, the historical payment data includes multiple groups of data corresponding to multiple time periods; and the historical payment data includes time sequence information, and the time sequence information is used to identify a time sequence of the multiple groups of data.

In a possible implementation, the historical payment data includes multiple groups of data corresponding to multiple geographical locations; and the historical payment data includes spatial sequence information, and the spatial sequence information is used to identify a spatial sequence of the multiple groups of data relative to the target IoT device.

According to a second aspect, an apparatus for perceiving future users of transaction services is provided, and the apparatus includes: a first acquisition unit, configured to obtain first environmental factor data in a first time period and first historical payment data corresponding to each historical payment behavior of a target IoT device in the first time period, where the first time period is before a current time; a second acquisition unit, configured to obtain second environmental factor data in a second time period, where the second time period is after the current time; and an estimation unit, configured to use the first environmental factor data and the first historical payment data obtained by the first acquisition unit and the second environmental factor data obtained by the second acquisition unit as inputs to a pre-trained neural network model, and obtain, by using the neural network model, and in accordance with predetermined indicators, estimated statistical distribution of users who execute transactions by using the target IoT device in the second time period.

According to a third aspect, a computer readable storage medium is provided, where the computer readable storage medium stores a computer program, and when the computer program is executed in a computer, the computer is enabled to perform the method according to the first aspect.

According to a fourth aspect, a computing device is provided, and includes a memory and a processor, where the memory stores executable code, and when the processor executes the executable code, the method according to the first aspect is implemented.

According to the methods and apparatuses provided in the implementations of the present specification, first, the first environmental factor data in the first time period and the first historical payment data corresponding to each historical payment behavior of the target IoT device in the first time period are obtained, where the first time period is before the current time; then, the second environmental factor data in the second time period is obtained, where the second time period is after the current time; and finally, the first environmental factor data, the first historical payment data, and the second environmental factor data are used as inputs to the pre-trained neural network model, and the estimated statistical distribution of the users who execute transactions by using the target IoT device in the second time period is obtained by using the neural network model and in accordance with the predetermined indicators. It can be seen from the previous description that the solution is a software solution that can reduce complexity and costs when future users of transaction services are perceived.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can further derive other drawings from these accompanying drawings without creative efforts.

DESCRIPTION OF IMPLEMENTATIONS

The following describes the solutions provided in the present specification with reference to the accompanying drawings.

Figure 1:
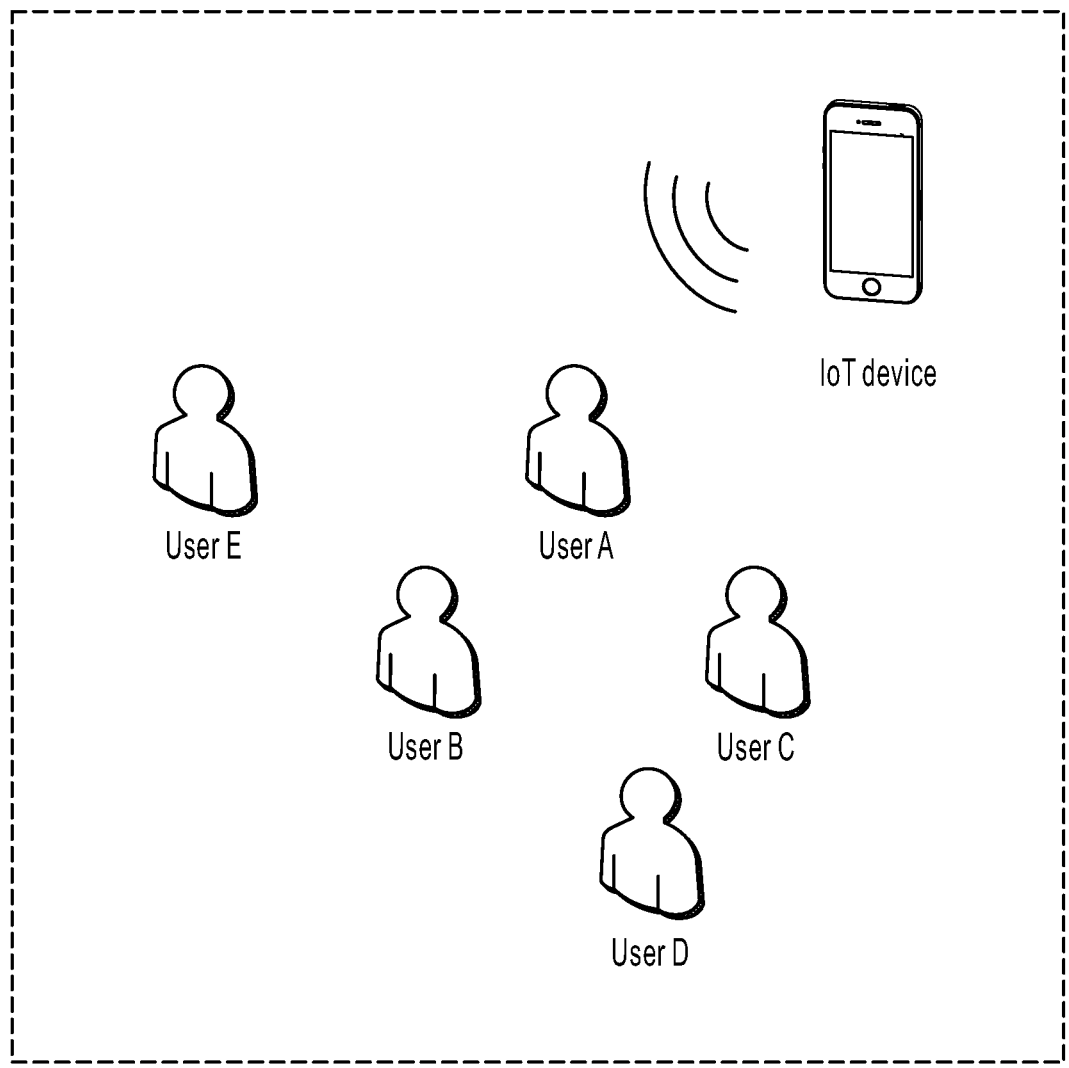
FIG. 1 is a schematic diagram illustrating an implementation scenario of an implementation, according to the present specification.

FIG. 1 is a schematic diagram illustrating an implementation scenario of an implementation, according to the present specification. The implementation scenario relates to advance perception of a transaction user. For example, in a commercial scenario in which an offline payment is made by using an IoT device, after a user makes a payment by using the IoT device, the IoT device can broadcast some audio notifications that include a marketing audio. The audio targets multiple users, and therefore estimation of statistical distribution of the users in accordance with predetermined indicators has important practical significance. This helps to play different marketing audio purposefully, and achieve a better marketing effect. It can be understood that estimation of the statistical distribution of the users in accordance with the predetermined indicators can include but is not limited to estimation of gender distribution, estimation of age distribution, and estimation of payment frequency distribution. A time period for estimation can be weeks, days, hours, etc. For example, statistical distribution of users in accordance with the predetermined indicators is estimated for the next week, or statistical distribution of users in accordance with the predetermined indicators is estimated for the next day (namely, tomorrow), or statistical distribution of users in accordance with the predetermined indicators is estimated for the next hour.

In the implementations of the present specification, first environmental factor data in a first time period before a current time, first historical payment data corresponding to each historical payment behavior of a target IoT device in the first time period, and second environmental factor data in a second time period after the current time are used as inputs to a pre-trained neural network model, and estimated statistical distribution of users who execute transactions by using the target IoT device in the second time period is obtained by using the neural network model and in accordance with predetermined indicators. It can be understood that the environmental factor data can include but is not limited to data such as weather data and holiday data. The historical payment data can include but is not limited to data such as user profile data, merchant feature data, geographical location information, and sequence information. The statistical distribution that is of the users who execute transactions by using the target IoT device and is in accordance with the predetermined indicators is estimated by considering a change of an environmental factor, so that a prediction result can be more accurate.

Figure 2:
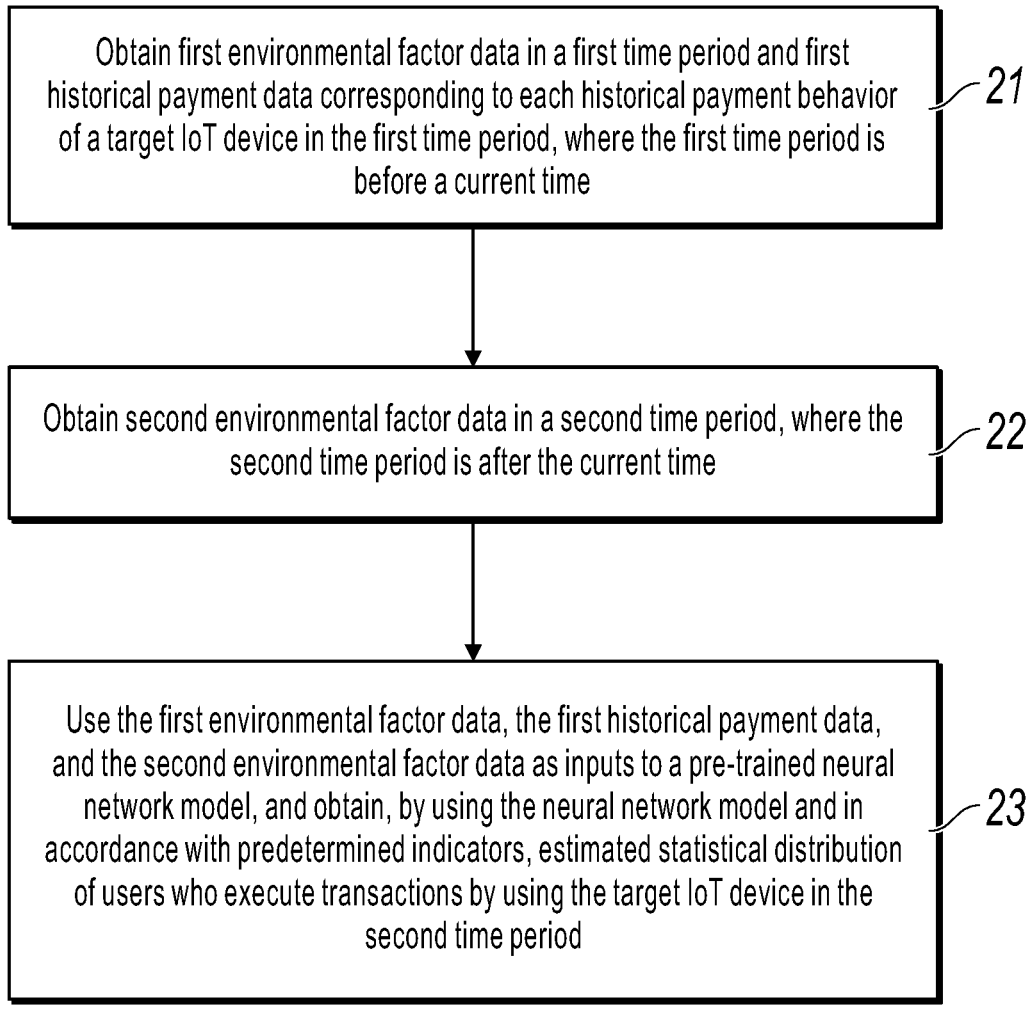
FIG. 2 is a flowchart illustrating a method for perceiving future users of transaction services, according to an implementation.

FIG. 2 is a flowchart illustrating a method for perceiving future users of transaction services, according to an implementation. The method can be based on the application scenario shown in FIG. 1. As shown in FIG. 2, the method for perceiving future users of transaction services in the present implementation includes the following steps: Step 21: Obtain first environmental factor data in a first time period and first historical payment data corresponding to each historical payment behavior of a target IoT device in the first time period, where the first time period is before a current time. Step 22: Obtain second environmental factor data in a second time period, where the second time period is after the current time. Step 23: Use the first environmental factor data, the first historical payment data, and the second environmental factor data as inputs to a pre-trained neural network model, and obtain, by the neural network model and in accordance with predetermined indicators, estimated statistical distribution of users who execute transactions by using the target IoT device in the second time period. The following describes specific implementations of the steps.

First, in step 21, the first environmental factor data in the first time period and the first historical payment data corresponding to each historical payment behavior of the target IoT device in the first time period are obtained, where the first time period is before the current time. It can be understood that duration of the first time period can be predetermined based on a strategy, for example, a week before a current date or 24 hours before a current time point.

In an example, the historical payment data includes at least one of the following: user profile data, merchant feature data, geographical location information, and sequence information.

The user profile data can be determined in the following way: obtaining raw profile data of each user, where the raw profile data includes at least one feature of age, a preference label (also referred to as a taste), or the quantity of historical payments; and determining a first moment, a second moment, a third moment, and a summation result of each feature value corresponding to a target feature of each user, and using the first moment, the second moment, the third moment, and the summation result corresponding to each feature as the user profile data of each user.

For example, if the target feature is age, a first moment $f_{1,1}$, a second moment $f_{1,2}$, a third moment $f_{1,3}$, and a summation result $f_{1,4}$ are calculated for age of each user. If there are N users, $f_{1,1}$, $f_{1,2}$, $f_{1,3}$, and $f_{1,4}$ are defined as follows:

$$f_{1,1} = 1/N \sum_{i=1}^{N} f_{1,i}; \quad (1)$$

$$f_{1,2} = 1/N \sum_{i=1}^{N} (f_{1,i} - f_{1,1})^2; \quad (2)$$

$$f_{1,3} = 1/N \sum_{i=1}^{N} (f_{1,i} - f_{1,1})^3; \quad (3)$$

$$f_{1,4} = \sum_{i=1}^{N} f_{1,i}. \quad (4)$$

When the raw profile data includes multiple features, $f_{1,1}$, $f_{1,2}$, $f_{1,3}$, and $f_{1,4}$ are calculated respectively for each feature to constitute an entire feature $f_1$ as the user profile data of each user.

The environmental factor data can be determined in the following way: obtaining at least one of a weather feature, a holiday feature, and a weekend and working day feature as the environmental factor data.

For example, the environmental factor data mainly includes features such as the weather feature $f_{2,1}$, the time feature $f_{2,2}$, the holiday feature $f_{2,3}$, and the weekend and working day feature $f_{2,4}$. The weather feature is quantified to five levels: severe, bad, medium, good, and excellent. The time feature is classified in an hour dimension, and each hour corresponds to one value. The time feature is associated with the weather feature, and each hour may correspond to a different weather feature. The holiday feature is based on the government-specified lunar calendar and general calendar, and a holiday is set to 1, and a day other than the holiday is set to 0. The weekend and working day feature is processed in the following way: A weekend is set to 1, and a working day is set to 0. All the features constitute a feature $f_2$, namely, the environmental factor data.

The merchant feature data can include at least one of the following: an industry type of a merchant, a feature label of the merchant (also referred to as a taste of the merchant), trading area information of the merchant, and information around the merchant, where the industry type of the merchant is determined based on a government-specified merchant category code (MCC) standard; the feature label of the merchant is set based on a printed label type of a consumption record of a user for the merchant; the trading area information of the merchant is determined based on point of interest (POI) information; and the information around the merchant is determined based on the quantity of merchants in a predetermined geographical area.

For example, the merchant feature data includes the industry type $f_{3,1}$ of the merchant, the taste $f_{3,2}$ of the merchant, the trading area information $f_{3,3}$ of the merchant, and the information $f_{3,4}$ around the merchant. The industry type can be calculated based on the government-specified MCC standard. The taste of the merchant can be set based on the printed label type of the consumption record of the user for the merchant. The trading area information is based on the POI information, is classified into multiple POI types such as a school and a hospital, and can be obtained based on the POI information in an electronic map. The information around the merchant can be the quantity of merchants within one kilometer, and the quantity of merchants can be calculated based on reported active data of a user.

The geographical location information can be determined in the following way: obtaining reported active locations of each user and a geographical location of a merchant to calculate a distance between each user and the merchant; and using a combination of the distances between the users and the merchant as the geographical location information.

For example, the geographical location information is determined in the following way: A distance between a payment user to a merchant L0 is calculated by using reported active locations Li (an average value of historically active locations) of the user and a location-based service (LBS) geographical location of the merchant, and an average value is calculated for N users. A calculation equation is as follows:

$$f_{4,1} = 1/N \sum_{i=1}^{N} (L_i - L_0)^2. \quad (5)$$

In an example, the historical payment data includes multiple groups of data corresponding to multiple time periods;

and the historical payment data includes time sequence information, and the time sequence information is used to identify a time sequence of the multiple groups of data.

It can be understood that the time period can be days, hours, etc.

In an example, the historical payment data includes multiple groups of data corresponding to multiple geographical locations; and the historical payment data includes spatial sequence information, and the spatial sequence information is used to identify a spatial sequence of the multiple groups of data relative to the target IoT device.

For example, in addition to the features of the user profile data, the merchant feature data, the geographical location information, and the environmental factor data, for the sequence information, all features can be extended in a time dimension to obtain a sequence feature in the time dimension, or can be extended in a spatial dimension to obtain a feature in the spatial dimension. Specific calculation methods of the spatial sequence information and the time sequence information are as follows:

$$f_{5,1} = |L_i - L_0|_1 \quad (6),$$

$$f_{5,2} = |T_i - T_0|_1 \quad (7), \text{ where}$$

$L_0$ represents a current location, for example, a location of the IoT device, and $T_0$ represents a current time point. A payment time point $T_i$ and location information $L_i$ are calculated to obtain an absolute value of a location difference and an absolute value of a time difference, and each feature is ranked in terms of time based on a payment time of each user.

Then, in step 22, the second environmental factor data in the second time period is obtained, where the second time period is after the current time. It can be understood that the second environmental factor data and the first environmental factor data include the same feature. For example, if the first environmental factor data includes a weather feature, a holiday feature, and a weekend and working day feature, the second environmental factor data also includes a weather feature, a holiday feature, and a weekend and working day feature. For the first environmental factor data and the second environmental factor data, methods for determining each feature are the same, and are omitted here for simplicity.

Finally, in step 23, the first environmental factor data, the first historical payment data, and the second environmental factor data are used as inputs to the pre-trained neural network model, and the estimated statistical distribution of the users who execute transactions by using the target IoT device in the second time period is obtained by using the neural network model and in accordance with predetermined indicators. It can be understood that the neural network model can be pre-trained by using historical data.

In an example, the neural network model is trained in the following way: obtaining third environmental factor data in a third time period and second historical payment data corresponding to each historical payment behavior of the target IoT device in the third time period, where the third time period is before the current time; obtaining fourth environmental factor data in a fourth time period, where the fourth time period is before the current time, and the fourth time period is after the third time period; obtaining actual statistical distribution of users who execute transactions by using the target IoT device in the fourth time period and that is defined with respect to the predetermined indicators; and training the neural network model by using the third environmental factor data, the second historical payment data, and the fourth environmental factor data as sample inputs to the neural network model and using the actual statistical distribution as sample labels.

In an example, the predetermined indicator includes at least one of the following: gender, age, and payment frequency.

It can be understood that when the predetermined indicator is gender, a proportion of male users to the users and a proportion of female users to the users can be estimated. When the predetermined indicator is age, a proportion of users to the users in each age group can be estimated. When the predetermined indicator is payment frequency, a proportion of users to the users in each payment frequency range can be estimated.

In an example, the neural network model includes: a long short-term memory (LSTM) network model.

It can be understood that other models can be used, for example, a recurrent neural network (RNN) model.

According to the methods provided in the present implementation of the present specification, first, the first environmental factor data in the first time period and the first historical payment data corresponding to each historical payment behavior of the target IoT device in the first time period are obtained, where the first time period is before the current time; then, the second environmental factor data in the second time period is obtained, where the second time period is after the current time; and finally, the first environmental factor data, the first historical payment data, and the second environmental factor data are used as inputs to the pre-trained neural network model, and the estimated statistical distribution of the users who execute transactions by using the target IoT device in the second time period is obtained by using the neural network model and in accordance with the predetermined indicators. It can be seen from the previous description that the solution is a software solution that can reduce complexity and costs when future users of transaction services are perceived.

Figure 3:
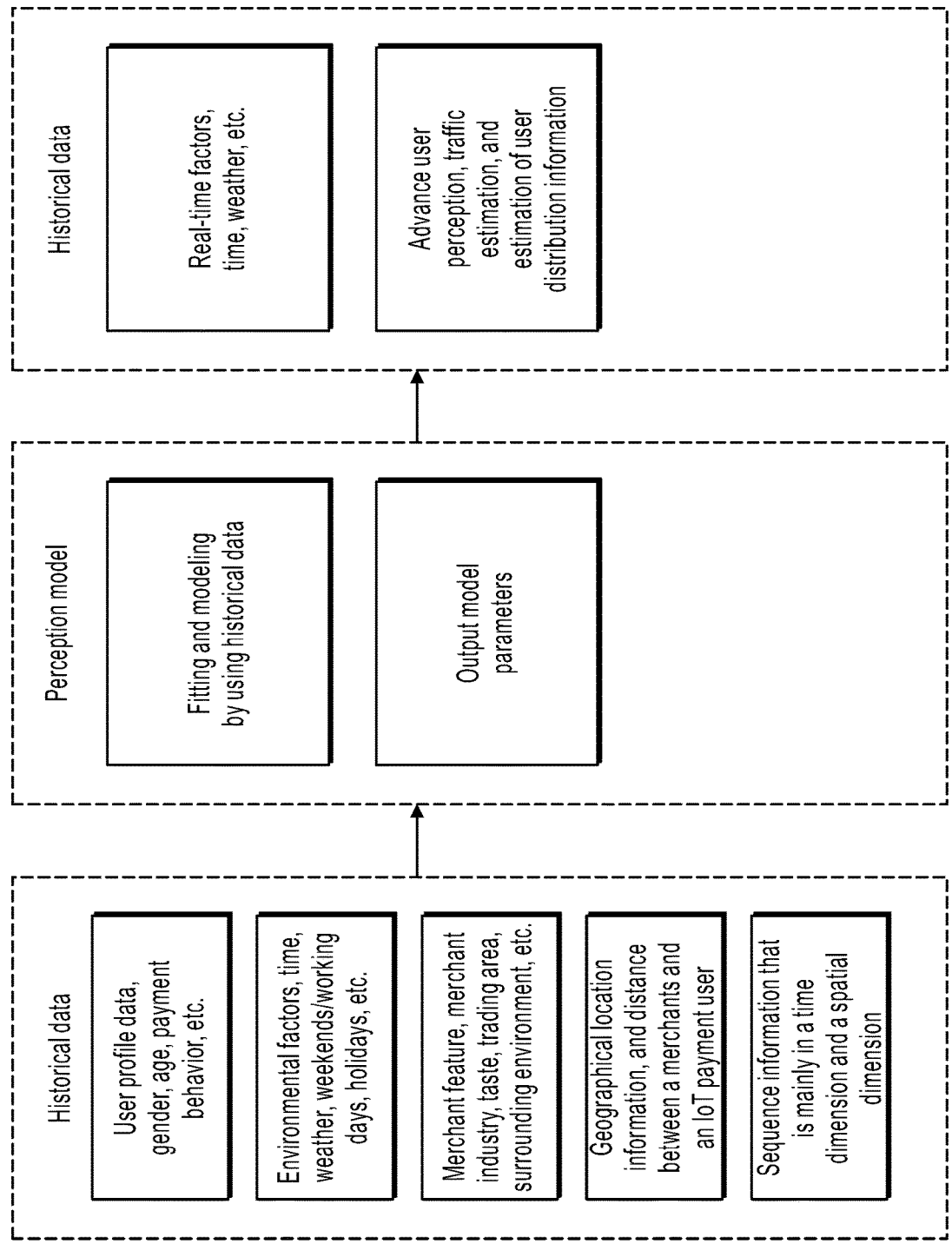
FIG. 3 is a schematic diagram illustrating building a perception model, according to an implementation.

FIG. 3 is a schematic diagram illustrating building a perception model, according to an implementation. In the present implementation of the present specification, model fitting is performed with reference to historical payment data and environmental factor data of an IoT scenario, advance perception is performed in a real-time scenario, and traffic and a user profile are estimated in advance. The main process includes the following content.

First, based on a historical payment behavior of an IoT device, for example, historical payment data on the Tth day, user profile data, merchant feature data, geographical location information, sequence information, and environmental factor data of the Tth day that are included in the historical payment data are all quantized, and are respectively represented as f1, f2, f3, f4, and f5. An indicator for advance perception is set, and can be referred to as traffic y (for example, gender distribution y1, age distribution y2, and user payments distribution y3).

Then, a perception model y=w1*f1+w2*f2+w3*f3+w4*f4+w5*f5 can be built based on the features f1, f2, f3, f4, and f5 of the Tth day and a perception indicator y of the (T+1)th day, and can be based on an LSTM model.

Finally, traffic y'=w1*f1'+w2*f2'+w3*f3'+w4*f4'+w5*f5' of the (T+2)th day is predicted by using the trained model based on features f1', f2', f3', f4', and f5' of the (T+1)th day.

It can be understood that the historical payment data in the present implementation of the present specification can further include another user behavior feature, for example, an occupation feature of a payment user of the IoT device.

In the present implementation of the present specification, based on the feature that the IoT device is combined with a payment scenario, a user profile, merchant information, and geographical location information that are related to the IoT device are extracted for advance user perception. Specific offline payment factors, sequence information in time and spatial dimensions, external weather factors, etc. are referenced, to improve estimation accuracy.

Figure 4:
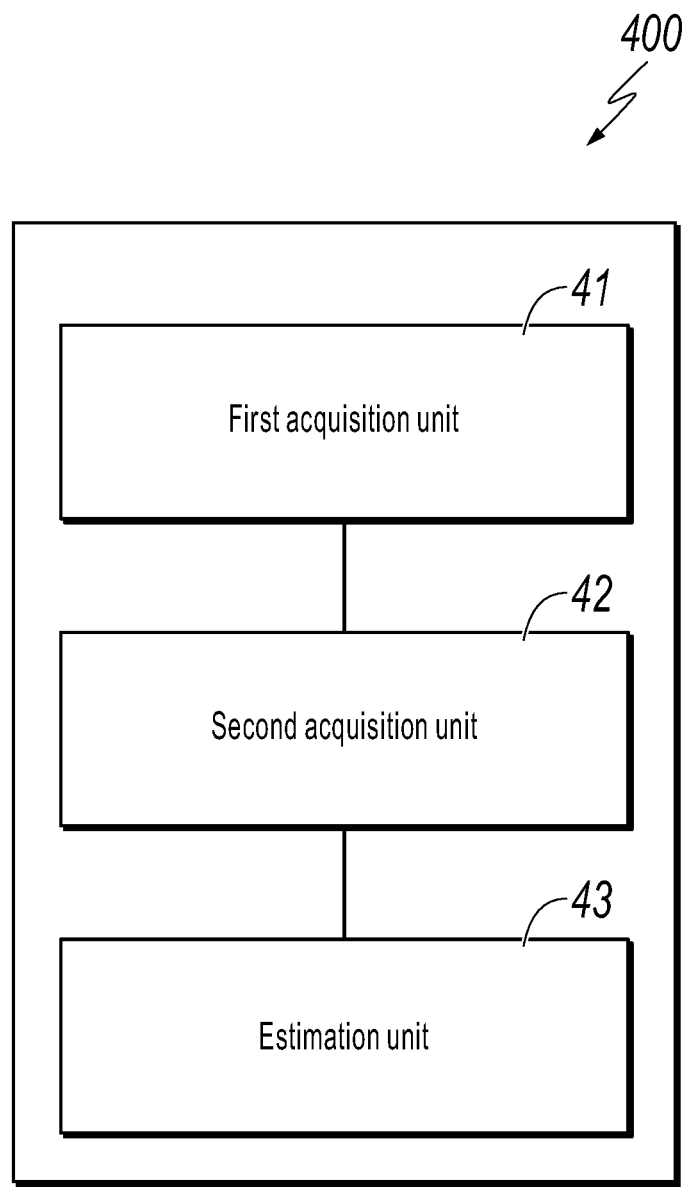
FIG. 4 is a schematic diagram illustrating an apparatus for perceiving future users of transaction services, according to an implementation.

According to an implementation of another aspect, an apparatus for perceiving future users of transaction services is further provided. The apparatus is configured to perform the method for perceiving future users of transaction services provided in the implementations of the present specification. FIG. 4 is a schematic diagram illustrating an apparatus for perceiving future users of transaction services, according to an implementation. As shown in FIG. 4, the apparatus 400 includes: a first acquisition unit 41, configured to obtain first environmental factor data in a first time period and first historical payment data corresponding to each historical payment behavior of a target Internet of Things (IoT) device in the first time period, where the first time period is before a current time; a second acquisition unit 42, configured to obtain second environmental factor data in a second time period, where the second time period is after the current time; and an estimation unit 43, configured to use the first environmental factor data and the first historical payment data obtained by the first acquisition unit 41 and the second environmental factor data obtained by the second acquisition unit 42 as inputs to a pre-trained neural network model, and obtain, by using the neural network model and in accordance with predetermined indicators, estimated statistical distribution of users who execute transactions by using the target IoT device in the second time period.

Optionally, in an implementation, the neural network model is trained in the following way: obtaining third environmental factor data in a third time period and second historical payment data corresponding to each historical payment behavior of the target IoT device in the third time period, where the third time period is before the current time; obtaining fourth environmental factor data in a fourth time period, where the fourth time period is before the current time, and the fourth time period is after the third time period; obtaining actual statistical distribution of users who execute transactions by using the target IoT device in the fourth time period and that is defined with respect to the predetermined indicators; and training the neural network model by using the third environmental factor data, the second historical payment data, and the fourth environmental factor data as sample inputs to the neural network model and using the actual statistical distribution as sample labels.

Optionally, in an implementation, the historical payment data includes at least one of the following: user profile data, merchant feature data, geographical location information, and sequence information.

Optionally, in an implementation, the predetermined indicator includes at least one of the following: gender, age, and payment frequency.

Optionally, in an implementation, the neural network model includes: a long short-term memory (LSTM) network model.

Optionally, in an implementation, the historical payment data includes user profile data; and the user profile data is determined in the following way: obtaining raw profile data of each user, where the raw profile data includes at least one feature of age, a preference label, or the quantity of historical payments; and determining a first moment, a second moment, a third moment, and a summation result of each feature value corresponding to a target feature of each user, and using the first moment, the second moment, the third moment, and the summation result corresponding to each feature as the user profile data of each user.

Optionally, in an implementation, the historical payment data includes environmental factor data; and the environmental factor data is determined in the following way: obtaining at least one of a weather feature, a holiday feature, and a weekend working day feature as the environmental factor data.

Optionally, in an implementation, the historical payment data includes merchant feature data; and the merchant feature data includes at least one of the following: an industry type of a merchant, a feature label of the merchant, trading area information of the merchant, and information around the merchant, where the industry type of the merchant is determined based on a government-specified merchant category code (MCC) standard; the feature label of the merchant is set based on a printed label type of a consumption record of a user for the merchant; the trading area information of the merchant is determined based on point of interest (POI) information; and the information around the merchant is determined based on the quantity of merchants in a predetermined geographical area.

Optionally, in an implementation, the historical payment data includes geographical location information; and the geographical location information is determined in the following way: obtaining reported active locations of each user and a geographical location of a merchant to calculate a distance between each user and the merchant; and using a combination of the distances between the users and the merchant as the geographical location information.

Optionally, in an implementation, the historical payment data includes multiple groups of data corresponding to multiple time periods; and the historical payment data includes time sequence information, and the time sequence information is used to identify a time sequence of the multiple groups of data.

Optionally, in an implementation, the historical payment data includes multiple groups of data corresponding to multiple geographical locations; and the historical payment data includes spatial sequence information, and the spatial sequence information is used to identify a spatial sequence of the multiple groups of data relative to the target IoT device.

According to the apparatus provided in the present implementation of the present specification, first, the first acquisition unit 41 obtains the first environmental factor data in the first time period and the first historical payment data corresponding to each historical payment behavior of the target IoT device in the first time period, where the first time period is before the current time; then, the second acquisition unit 42 obtains the second environmental factor data in the second time period, where the second time period is after the current time; and finally, the estimation unit 43 uses the first environmental factor data, the first historical payment data, and the second environmental factor data as inputs to the pre-trained neural network model, and obtains, by using the neural network model and in accordance with predetermined indicators, the estimated statistical distribution of the users who execute transactions by using the target IoT device in the second time period. It can be seen from the previous description that the solution is a software solution that can reduce complexity and costs when future users of transaction services are perceived.

According to an implementation of another aspect, a computer readable storage medium is provided. The computer readable storage medium stores a computer program, and when the computer program is executed in a computer, the computer is enabled to perform the method described with reference to FIG. 2.

According to an implementation of still another aspect, a computing device is further provided, and includes a memory and a processor. The memory stores executable code, and when the processor executes the executable code, the method described with reference to FIG. 2 is implemented.

A person skilled in the art should be aware that in the previous one or more examples, functions described in the present disclosure can be implemented by hardware, software, firmware, or any combination thereof. When the functions are implemented by software, the functions can be stored in a computer readable medium or transmitted as one or more instructions or code in a computer readable medium.

The objectives, technical solutions, and beneficial effects of the present disclosure are further described in detail in the previously described specific implementations. It should be understood that the previous descriptions are merely specific implementations of the present disclosure, and are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method, comprising:
    obtaining first environmental factor data of a first time period and first historical payment data of a target Internet of Things (IoT) device in the first time period, wherein the first time period is before a first time point, and
    wherein the first historical payment data comprises data of payments made by offline user interaction using the target IoT device, and wherein the first environmental factor data comprises data of a context of the payments made by offline user interaction using the target IoT device;
    obtaining second environmental factor data of a second time period that is after the first time point; and
    obtaining a prediction, using a neural network model operating on at least one computing device, of an estimated statistical distribution of a plurality of other users who will execute transactions by offline user interaction using the target IoT device in the second time period,
    wherein the first environmental factor data, the first historical payment data, and the second environmental factor data are inputs to the neural network model.

2. The computer-implemented method of claim 1, comprising training the neural network model, wherein training the neural network model comprises:
    obtaining third environmental factor data of a third time period and second historical payment data of the target IoT device in the third time period, wherein the third time period is before the first time point;
    obtaining fourth environmental factor data of a fourth time period, wherein the fourth time period is before the first time point and after the third time period;
    obtaining an actual statistical distribution of users who execute transactions by offline user interaction using the target IoT device in the fourth time period; and
    training the neural network model by using the third environmental factor data, the second historical payment data, and the fourth environmental factor data as sample inputs to the neural network model, wherein the actual statistical distribution of users is a sample label of the sample inputs for the neural network model.

3. The computer-implemented method of claim 1, wherein the first historical payment data comprises at least one of the following:
    user profile data, merchant feature data, geographic location information, or sequence information.

4. The computer-implemented method of claim 1, wherein the estimated statistical distribution is defined with respect to at least one of the following:
    gender, age, or payment frequency.

5. The computer-implemented method of claim 1, wherein the first historical payment data comprises user profile data, and wherein the method further comprises deriving the user profile data, wherein deriving the user profile data comprises:
    obtaining raw profile data of each user of a plurality of users who interact offline with the target IoT device, wherein the raw profile data comprises at least one target feature, and wherein the at least one target feature comprises at least one of an age of the user, a preference label for the user, or a quantity of historical payments made by the user;
    determining a first moment, a second moment, a third moment, and a summation result corresponding to each target feature of each user; and
    using the first moment, the second moment, the third moment, and the summation result corresponding to each target feature of each user as the user profile data of the user.

6. The computer-implemented method of claim 1, wherein the first environmental factor data comprises at least one of: a weather feature, a holiday feature, or a weekend and working day feature.

7. The computer-implemented method of claim 1, wherein the first historical payment data comprises geographic location information, and further comprising determining the geographic location information, wherein determining the geographic location information comprises:
    obtaining reported active locations of each user of a plurality of users who interact offline with the target IoT device, and a location of a merchant;
    calculating, based on the obtained reported active locations and the location of the merchant, a distance between each user and the merchant; and
    determining the geographical location information based on the distances between each user and the merchant.

8. The computer-implemented method of claim 1, comprising:
    subsequent to obtaining the prediction, emitting, by the target IoT device, an audio notification, the audio notification being targeted based on the estimated statistical distribution of the plurality of other users who will execute transactions by offline user interaction using the target IoT device in the second time period according to the prediction.

9. A non-transitory, computer-readable medium storing one or more instructions that, when executed by a computer system, cause the computer system to perform operations comprising:
    obtaining first environmental factor data of a first time period and first historical payment data of a target Internet of Things (IoT) device in the first time period, wherein the first time period is before a first time point, and wherein the first historical payment data comprises data of payments made by offline user interaction using the target IoT device, and wherein the first environmental factor data comprises data of a context of the payments made by offline user interaction using the target IoT device;

obtaining second environmental factor data of a second time period that is after the first time point; and obtaining a prediction, using a neural network model operating on the computing system, of an estimated statistical distribution of a plurality of other users who will execute transactions by offline user interaction using the target IoT device in the second time period, wherein the first environmental factor data, the first historical payment data, and the second environmental factor data are inputs to the neural network model.

10. The non-transitory, computer-readable medium of claim 9, wherein the operations comprise training the neural network model, and wherein training the neural network model comprises:

obtaining third environmental factor data of a third time period and second historical payment data of the target IoT device in the third time period, wherein the third time period is before the first time point;

obtaining fourth environmental factor data of a fourth time period, wherein the fourth time period is before the first time point and after the third time period;

obtaining an actual statistical distribution of users who execute transactions by offline user interaction using the target IoT device in the fourth time period; and training the neural network model by using the third environmental factor data, the second historical payment data, and the fourth environmental factor data as sample inputs to the neural network model, wherein the actual statistical distribution of users is a sample label of the sample inputs for the neural network model.

11. The non-transitory, computer-readable medium of claim 9, wherein the first historical payment data comprises at least one of the following:

user profile data, merchant feature data, geographic location information, or sequence information.

12. The non-transitory, computer-readable medium of claim 9, wherein the estimated statistical distribution is defined with respect to at least one of the following:

gender, age, or payment frequency.

13. The non-transitory, computer-readable medium of claim 9, wherein the first historical payment data comprises user profile data, wherein the operations comprise determining the user profile data, and wherein determining the user profile data comprises:

obtaining raw profile data of each user of a plurality of users who interact offline with the target IoT device, wherein the raw profile data comprises at least one target feature, and wherein the at least one target feature comprises at least one of an age of the user, a preference label for the user, or a quantity of historical payments made by the user;

determining a first moment, a second moment, a third moment, and a summation result corresponding to each target feature of each user; and using the first moment, the second moment, the third moment, and the summation result corresponding to each target feature of each user as the user profile data of the user.

14. The non-transitory, computer-readable medium of claim 9, wherein the first environmental factor data comprises at least one of: a weather feature, a holiday feature, or a weekend and working day feature.

15. The non-transitory, computer-readable medium of claim 9, wherein the first historical payment data comprises geographic location information, wherein the operations comprise determining the geographic location information, and wherein determining the geographic location information comprises:

obtaining reported active locations of each user of a plurality of users who interact offline with the target IoT device, and a location of a merchant;

calculating, based on the obtained reported active locations and the location of the merchant, a distance between each user and the merchant; and determining the geographical location information based on the distances between each user and the merchant.

16. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations comprising:

obtaining first environmental factor data of a first time period and first historical payment data of a target Internet of Things (IoT) device in the first time period, wherein the first time period is before a first time point, and wherein the first historical payment data comprises data of payments made by offline user interaction using the target IoT device, and wherein the first environmental factor data comprises data of a context of the payments made by offline user interaction using the target IoT device;

obtaining second environmental factor data of a second time period that is after the first time point; and obtaining a prediction, using a neural network model operating on the one or more computers, of an estimated statistical distribution of a plurality of other users who will execute transactions by offline user interaction using the target IoT device in the second time period, wherein the first environmental factor data, the first historical payment data, and the second environmental factor data are inputs to the neural network model.

17. The computer-implemented system of claim 16, wherein the operations comprise training the neural network model, and wherein training the neural network model comprises:

obtaining third environmental factor data of a third time period and second historical payment data of the target IoT device in the third time period, wherein the third time period is before the first time point;

obtaining fourth environmental factor data of a fourth time period, wherein the fourth time period is before the first time point and after the third time period;

obtaining an actual statistical distribution of users who execute transactions by offline user interaction using the target IoT device in the fourth time period; and training the neural network model by using the third environmental factor data, the second historical payment data, and the fourth environmental factor data as sample inputs to the neural network model, wherein the actual statistical distribution of users is a sample label of the sample inputs for the neural network model.

18. The computer-implemented system of claim 16, wherein the first historical payment data comprises at least one of the following:

user profile data, merchant feature data, geographic location information, or sequence information.

19. The computer-implemented system of claim 16, wherein the estimated statistical distribution is defined with respect to at least one of the following:

gender, age, or payment frequency.

20. The computer-implemented system of claim 16, wherein the first historical payment data comprises user profile data, and wherein the user profile data is determined by operations comprising:

obtaining raw profile data of each user of a plurality of users who interact offline with the target IoT device, wherein the raw profile data comprises at least one target feature, and wherein the at least one target feature comprises at least one of an age of the user, a preference label for the user, or a quantity of historical payments made by the user;

determining a first moment, a second moment, a third moment, and a summation result corresponding to each target feature of each user; and using the first moment, the second moment, the third moment, and the summation result corresponding to each target feature of each user as the user profile data of the user.

21. The computer-implemented system of claim 16, wherein the first environmental factor data comprises at least one of: a weather feature, a holiday feature, or a weekend and working day feature.

* * * * *